United States Patent [19]

Doyle

[11] Patent Number: 5,004,287
[45] Date of Patent: Apr. 2, 1991

[54] LOCKING DEVICE FOR REMOVABLE TAILGATE ASSEMBLY

[76] Inventor: Pat Doyle, P.O. Box 924128, Houston, Tex. 77292-4128

[21] Appl. No.: 384,503

[22] Filed: Jul. 25, 1989

[51] Int. Cl.⁵ ............................................ B62D 25/00
[52] U.S. Cl. .................................. 296/57.1; 292/181; 292/DIG. 43; 292/DIG. 29; 16/260
[58] Field of Search ................. 296/50, 57.1; 292/181, 292/DIG. 43, DIG. 29; 16/260, 261, 262

[56] References Cited

U.S. PATENT DOCUMENTS

| 3,656,801 | 4/1972 | Doutt et al. | 296/57.1 |
| 3,734,560 | 5/1973 | Cramblet | 296/57.1 X |
| 3,848,918 | 11/1974 | Dyer | 296/57.1 |
| 4,552,392 | 11/1985 | Morello | 292/181 |

FOREIGN PATENT DOCUMENTS 3612878  1/1987  Fed. Rep. of Germany ..... 296/57.1

Primary Examiner—Johnny D. Cherry
Assistant Examiner—Gary C. Hoge
Attorney, Agent, or Firm—Keeling & Associates

[57] ABSTRACT

A locking device is provided for a removable tailgate on a conventional pickup truck. The tailgate assembly is supported by a pair of hinges located at the bottom of the tailgate for opening movement about a horizontal axis, one of the hinges comprising an elongated pin member and receiver cup, the pin member extending from the truck body into the receiver cup located in the tailgate. An opening is provided in the side wall of the receiver cup to allow the pin member and consequently the tailgate to be removed when the opening is aligned with the narrow axis of the pin member. A cylinder lock and lock bolt is attached to the tailgate, the lock bolt extending through the end wall of the receiver cup. Upon engaging the lock, the lock bolt projects through the end wall of the receiver cup into an opening provided in the axis of the pin member, thereby allowing the tailgate to be locked to the pickup truck body while concurrently allowing the tailgate to be freely opened and closed along the horizontal axis of the hinges.

6 Claims, 3 Drawing Sheets

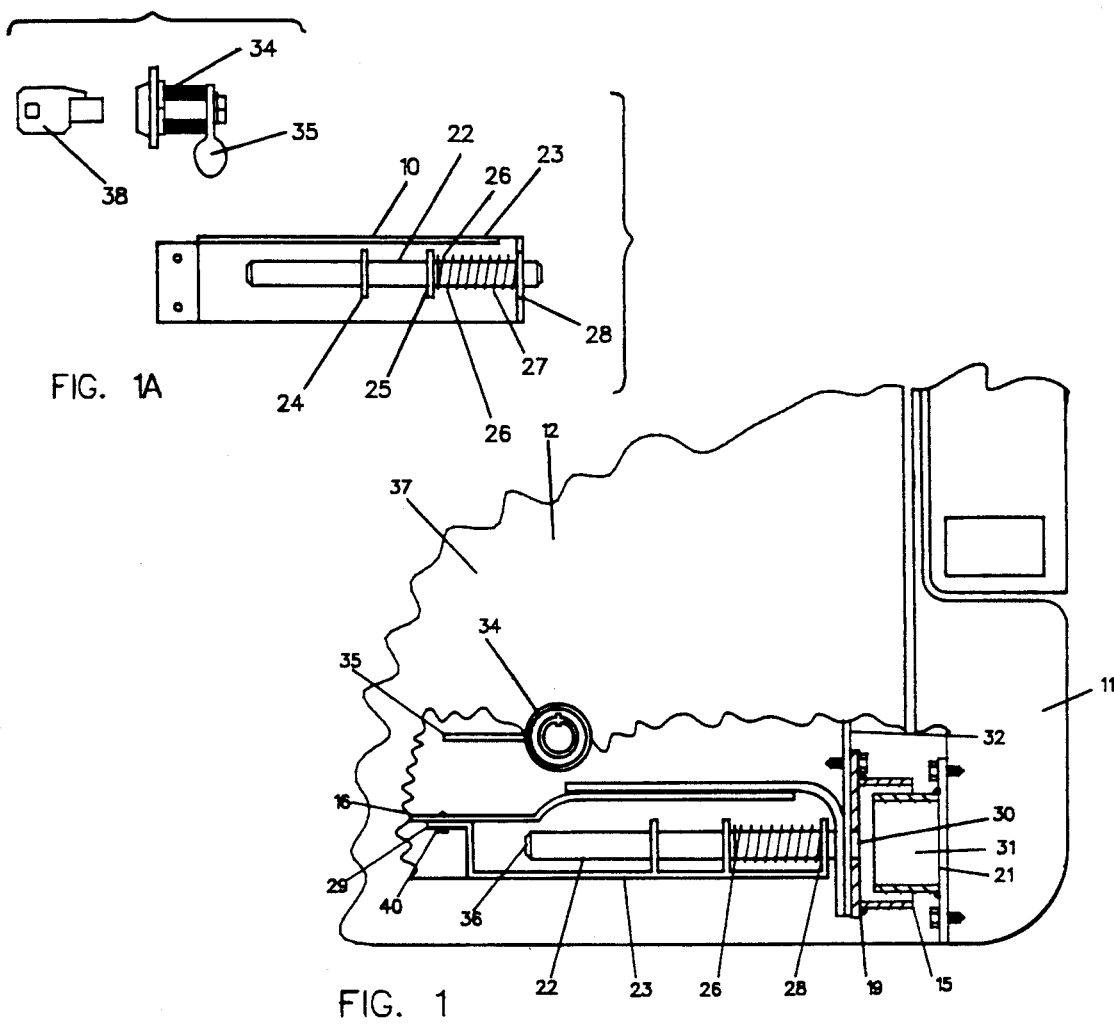
FIG. 1A
FIG. 1
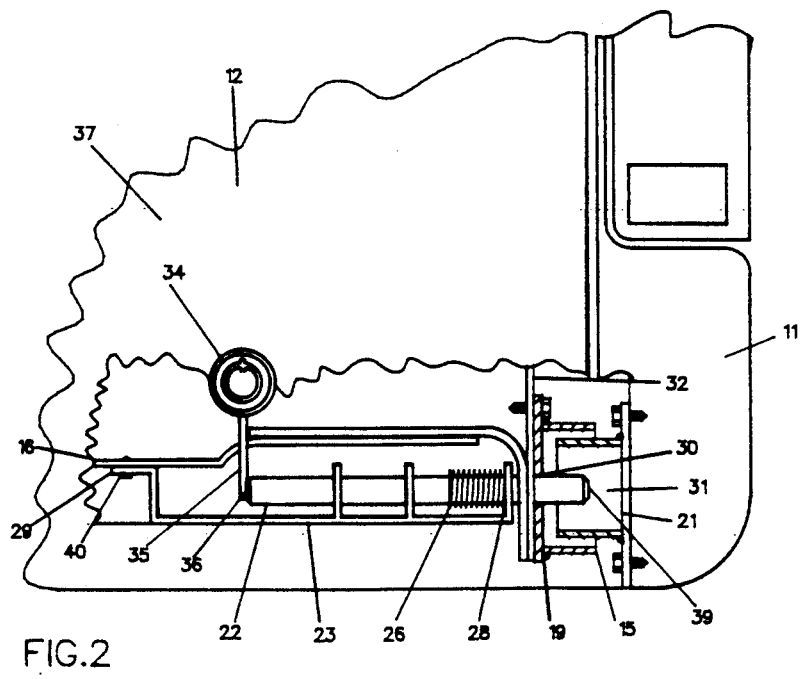
FIG. 2

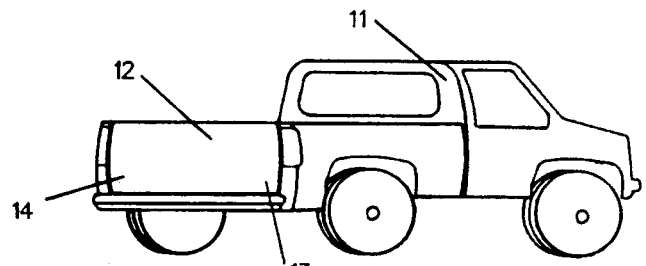
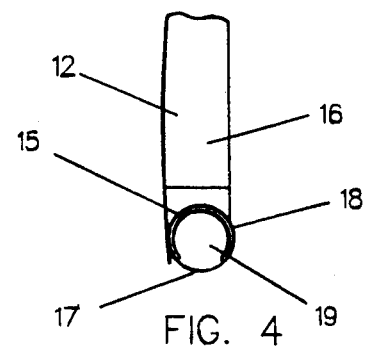
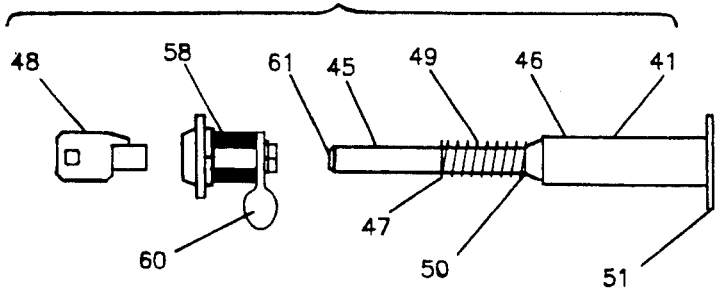
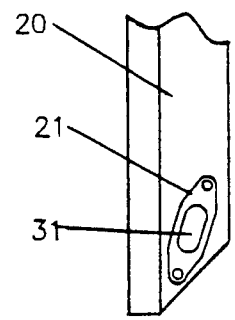
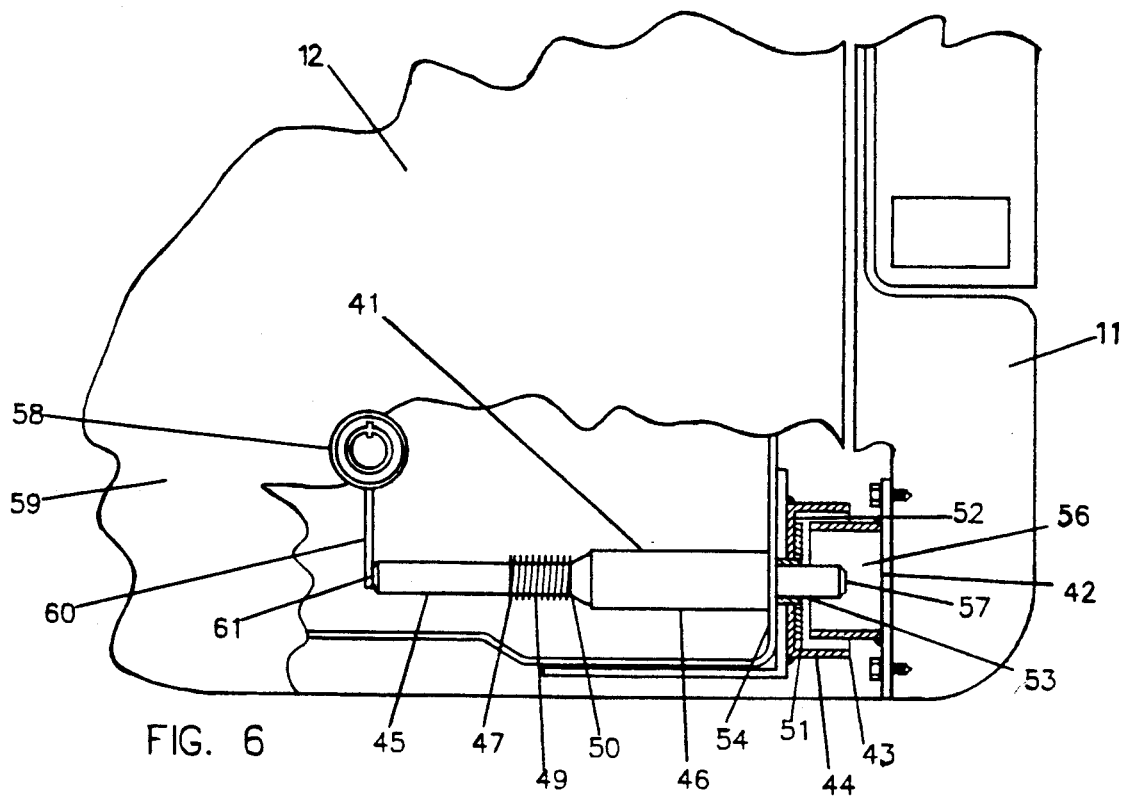

LOCKING DEVICE FOR REMOVABLE TAILGATE ASSEMBLY

BACKGROUND OF THE INVENTION

This invention pertains generally to locking devices and in particular to a locking device for a conventional removable pickup truck tailgate.

Conventional pickup truck tailgates are attached to the body of the pickup truck by hinges located at the bottom of the tailgate, allowing the tailgate to be latched in a vertical position and to be opened to a full horizontal position about the axis of the hinges. Conventional pickup trucks provide for relative convenience of removal of the tailgate to allow flexibility of use of the pickup truck.

A disadvantage of the relatively simple removal of tailgates is that they are frequently stolen. Although tailgates may be provided with standard locking devices, conventional locks are typically provided at the upper end of the tailgate, requiring the tailgate to be unlocked each time it is desired to open the tailgate.

The locking device of the present invention provides a substantial improvement over existing locking systems for pickup truck tailgates in that it allows the tailgate to be locked to the body of the pickup truck while permitting the tailgate to be used freely. The tailgate may be opened and closed without the necessity of unlocking the locking device. In the event that it is desired to remove the tailgate from the pickup truck body, the locking device may be unlocked and the tailgate disengaged.

Various U.S. Patents reflect locking devices and/or hinge assemblies, including Gergoe U.S. Pat. No. 4,076,301, Cain U.S. Pat. No. 3,924,293, McHeffey U.S. Pat. No. 3,911,621, Nagy, et al., U.S. Pat. No. 3,733,649, Foltz U.S. Pat. No. 3,475,684, Lauer, et al., U.S. Pat. No. 2,640,723, Haught U.S. Pat. No. 2,183,291, and Jett, et al., U.S. Pat. No. 2,022,886. The foregoing patents and current commercial practice do not teach the use of a locking device providing a lock bolt located in the axis of the hinge pin member and receiver cup of a pickup truck and tailgate as disclosed in the present invention.

It is therefore a purpose of the present invention to provide a locking device for a conventional removable tailgate and pickup truck.

It is a further purpose of the present invention to provide a locking device which may be installed on existing conventional removable tailgates for pickup trucks which device allows the tailgate to be rotated relative to the body of the pickup truck while the lock is engaged.

It is a further purpose of the present invention to provide a locking device for a conventional removable pickup truck tailgate which device allows the tailgate to be rotated relative to the body of the pickup truck while the lock is engaged.

It is a further purpose of the present invention to provide a locking device which may be installed on existing conventional removable tailgates for pickup trucks.

SUMMARY OF THE INVENTION

The foregoing and other objects of the present invention are accomplished by a locking device provided for a removable tailgate on a conventional pickup truck. The tailgate assembly is supported by a pair of hinges located at the bottom of the tailgate for opening movement about a horizontal axis, one of the hinges comprising an elongated pin member and receiving cup, the pin member extending from the truck body into a receiver cup provided in the tailgate. An opening is provided in the side wall of the receiver cup to allow the pin member and consequently the tailgate to be removed when the opening is aligned with the narrow axis of the pin member. A cylinder lock and lock bolt is attached to the tailgate, the lock bolt extending through the end wall of the receiver cup. Upon engaging the lock, the lock bolt projects through the end wall of the receiver cup into an opening provided in the pin member, thereby allowing the tailgate to be locked to the pickup truck body while concurrently allowing the tailgate to be freely opened and closed along the horizontal axis of the hinges.

BRIEF DESCRIPTION OF THE DRAWINGS

FIG. 1 illustrates a cut-away view of the locking device installed on a conventional pickup truck tailgate and pickup truck body with the lock disengaged.

FIG. 1A illustrates the locking device of the present invention prior to installation on a pickup truck tailgate.

FIG. 2 illustrates a cut-away view of the locking device installed on a conventional pickup truck tailgate and pickup body with the lock engaged.

FIG. 3 illustrates a conventional pickup truck and tailgate.

FIG. 4 illustrates an end view of a hinge cup on the tailgate of a conventional pickup truck.

FIG. 5 illustrates an end view of the hinge pin on a conventional pickup truck.

FIG. 6 illustrates a cut-away view of an alternative embodiment of the locking device installed on a different model of conventional pickup truck.

FIG. 6A illustrates an alternative embodiment of the present invention prior to installation on a pickup truck tailgate.

DESCRIPTION OF THE PREFERRED EMBODIMENT

Figure 7:
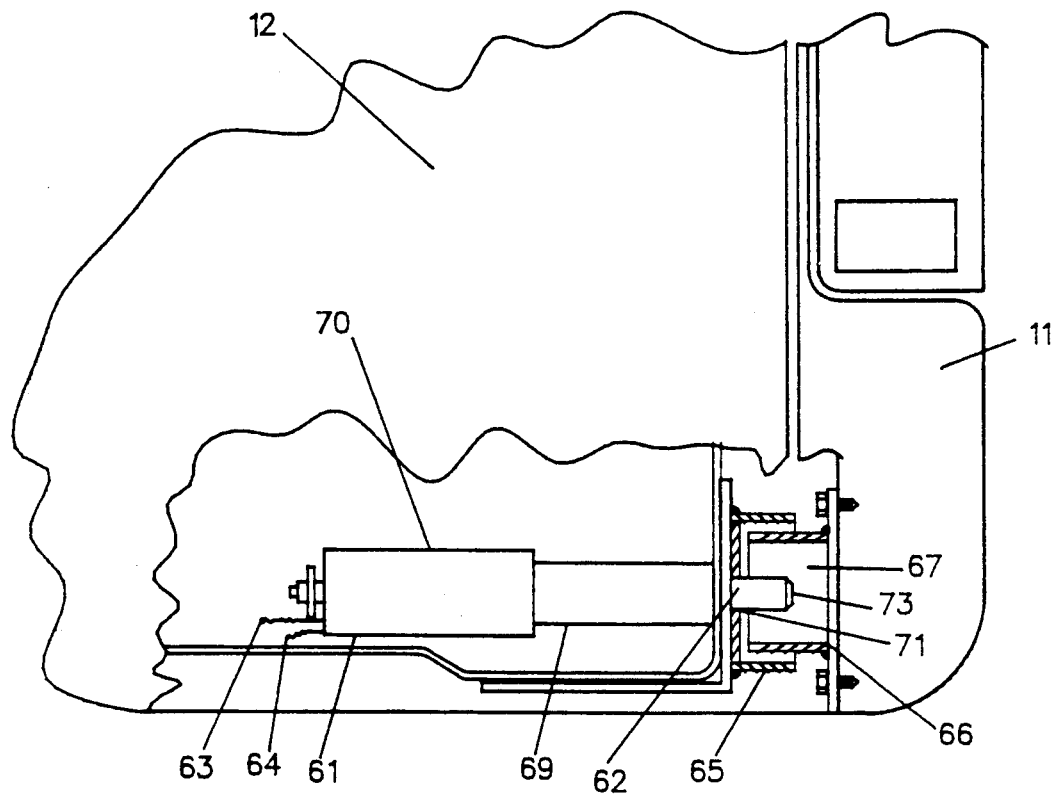
FIG. 7 illustrates a cut-away view of an alternative embodiment comprising a solenoid-activated lock bolt installed in the tailgate of a conventional pickup truck tailgate and truck body.

Referring to FIG. 3 which illustrates a pickup truck 11 having a tailgate 12 the location on the pickup truck 11 and tailgate 12 of the locking device 10 (not shown in FIG. 3) of the present invention is shown. Location 13 and location 14 indicated on FIG. 3 indicate the general locations where the tailgate 12 is rotatably attached to the pickup truck 11. The locking device 10 of the present invention may be located at hinge location 13 or at hinge location 14. Conventional pickup trucks provide a latching mechanism (not shown) at the top end of the tailgate 12 to allow the tailgate 12 to be rigidly attached to the truck body 11.

Referring to FIGS. 4 and 5, the hinge mechanism located at general location 13 of a conventional pickup truck tailgate 12 is depicted. Referring first to FIG. 4, an end view of the bottom section of tailgate 12 is depicted. A cup 15 is rigidly attached to the tailgate frame 16 at or near the bottom of the tailgate 12. Cup side wall 18 is provided with an opening 17 at the lower end of the cup 15. Cup 15 is defined by end wall 19 and the cup side wall 18. Now referring to FIG. 5, a view at general location 13 of side wall 20 of the body of truck 11 is shown. A hinge pin member 21 is rigidly attached to side wall 20. Hinge pin member 21 is provided with an elongated axis, the elongated axis being positioned at an angle from horizontal. Hinge pin member 21 is constructed such that it has a hollow core resulting in hinge pin opening 31. The narrow axis of the pin member 21 is sized so that its exterior diameter is slightly smaller than the opening 17 provided in cup wall 18. Referring to FIGS. 4 and 5 in conjunction, it may be seen that the tailgate 12 may be installed on the truck body 11 by aligning the opening 17 of side wall 18 of cup 15 with the narrow axis of elongated pin member 21 and sliding tailgate 12 in the direction parallel to the elongated axis of pin member 21. A hinge mechanism (not shown) is also provided at location 14. Upon installation tailgate 12 may be rotated about the central axis of pin member 21 and cup 15 and the hinge mechanism (not shown) at location 14.

Referring now to FIG. 1A, the locking device 10 of the present invention is depicted. In the preferred embodiment, a lock bolt 22 is provided in lock bolt housing 23. Lock bolt support members 24 and 25 are provided to surround and support lock bolt 22 limiting the freedom of movement of lock bolt 22 to a single direction, in this case horizontal. Nipples 26 are provided on lock bolt 22. Spring 27 surrounds lock bolt 22 and is compressed between the nipples 26 and the end 28 of lock bolt housing 23. The compressive force of spring 23 normally biases nipples 26 against support member 25 of lock bolt housing 23. Cylinder lock 34, lock plate 35 and key 38 are provided as a means of displacing lock bolt 22 as subsequently described herein.

Referring to FIG. 1, the locking device 10 is shown installed on tailgate frame 16 of a pickup truck. Fastening means 40 are provided to rigidly attach lock bolt housing 22 to the bottom surface 29 of tailgate frame 16. An opening 30 is provided in the end wall 19 of cup 15, the opening 30 being located at the central axis of end wall 19. Corresponding openings (not shown) are provided in sidewall 32 of tailgate frame 16 and in the end wall 28 of lock bolt housing 23. The location and dimensions of lock bolt housing 23 are so proportioned as to align lock bolt 22 with openings 30 and 31.

Still referring to FIG. 1, cylinder lock 34 is provided at the end 36 of lock bolt 22 opposite cup 15. Cylinder lock 34 is rigidly attached to the exterior surface 37 of tailgate 12. Cylinder lock 34, lock bolt housing 23 and lock bolt 22 are so proportioned and located each in relation to the other that plate 35 may be rotated to engage the end 36 of lock bolt 22. Upon insertion of the key into cylinder lock 34 and rotation of cylinder lock 34, plate 35 may be rotated against the end 36 of lock bolt 22 thereby displacing lock bolt 22 in a lateral direction toward hinge pin member 21 and compressing spring 27 between nipples 26 and end wall 28 of lock bolt housing 23.

Referring now to FIG. 2, the locking device 10 of the present invention is shown with the cylinder lock 34 in an engaged position. Displacement of lock bolt 22 as described thereby results in end 39 of lock bolt 22 extending into opening 31 provided in hinge pin member 21.

OPERATION OF THE PREFERRED EMBODIMENT

With reference to FIGS. 1 and 2, it may be seen that the spring 27 normally biases lock bolt 22 against the cylinder lock plate 35 by virtue of compression of spring 27 between nipples 26 and end wall 28 of lock bolt housing 23. Due to such bias, the end 39 of lock bolt 22 remains disengaged from the opening 31 of hinge pin member 21 when cylinder lock 34 is disengaged. Upon engaging cylinder lock 34, lock plate 35 is thereby rotated against the end 3 of lock bolt 22 laterally moving end 39 of lock bolt 22 into the opening 31 of hinge pin member 21 and compressing spring 27. When cylinder lock 34 and lock bolt 22 are thus engaged, lock bolt 22 prevents removal of hinge pin member 21 from cup 15 and consequently prevents removal of tailgate 12 from truck body 11. Due to the concentric location of lock bolt 22 with respect to hinge pin member 21 and cup 15, tailgate 12 may continue to be rotated about the axis of hinge member 21.

From the foregoing it may be seen that upon installation of the locking device 10 in a conventional pickup truck 11 and tailgate 12, the cylinder lock 34 may be engaged, thereby preventing the removal of tailgate 12 from the body of pickup truck 11. Tailgate 12 may continue, however, to be rotated on the horizontal axis of the hinge members located at locations 13 and 14, effectively allowing full use of the tailgate 12. In the event that removal of the tailgate is desired, cylinder lock 34 may be disengaged. Upon disengagement of cylinder lock 34 spring 27 biases nipples 26 against support member 25 thereby laterally moving lock bolt 22 away from pin member 21 and removing end 39 of lock bolt 22 from the opening 31 provided in hinge pin member 21, and the tailgate 12 may be removed as is presently practiced.

First Alternative Embodiment

Referring now to FIG. 6A, an alternative embodiment of the locking device 41 is illustrated. Lock bolt 45 is provided in cylindrical lock bolt housing 46. Lock bolt housing 46 surrounds and supports lock bolt 45 limiting the freedom of movement of lock bolt 45 to a single direction, in this case horizontal. Retainer 47 is provided on lock bolt 45 extending at an angle to lock bolt 45. Spring 49 surrounds lock bolt 45 and is normally biased between retainer 47 and the end wall 50 of lock bolt housing 46.

Referring to FIG. 6, hinge pin member 42 and cup member 43 provide the hinging mechanism for tailgate 12 relative to pickup truck body 11. As in the preferred embodiment, hinge pin member 42 is provided with an elongated axis, the elongated axis being positioned at an angle from the horizontal. Side wall 44 of cup 43 is provided with an opening (not shown) to allow tailgate 12 to be installed and removed from truck body 11 by aligning the opening (not shown) of the side wall 44 with the elongated axis of pin member 42 and sliding tailgate 12 in the direction parallel to the elongated axis of pin member 42.

Still referring to FIG. 6, flange 51 is rigidly attached at the end of lock bolt housing 46. The diameter of flange 51 is so proportioned as to fit within the wall 44 of cup 43. An opening (not shown) is provided in frame wall 54 of tailgate 12, said opening being of sufficient diameter to allow lock bolt housing 46 to be inserted therethrough such that flange 51 abuts end 52 of cup 43.

Fastening means (not shown) are provided to rigidly attach flange 51 to the end 52 of cup 43. An opening 53 is provided in flange 51 and is so proportioned and located in relation to lock bolt 45 as to allow lock bolt 45 to pass through the said opening 53.

Still referring to FIG. 6, hinge pin member 42 is constructed such that it has a hollow core resulting in opening 56. Lock bolt 45 and opening 53 are so proportioned and located as to allow lock bolt 45 to extend through opening 53 into opening 56 of hinge pin member 42. Cylinder lock 58 is provided at the end 61 of look bolt 45 opposite hinge pin member 42. Cylinder lock 58 is rigidly attached to the exterior surface 59 of tailgate 12. Cylinder lock 58 is proportioned with reference to lock bolt 45 and lock bolt housing 46 such that rotation of cylinder lock 58 and the consequent rotation of lock plate 60 causes lock plate 60 to engage end 61 of lock bolt 45 thereby laterally moving end 57 of lock bolt 46 into the opening 56 provided in hinge pin member 42 and thereby compressing spring 49 between retainer 47 and end wall 50. Disengagement of cylinder lock 58 and the consequent movement of lock plate 60 away from the end 61 of lock bolt 45 allows spring 49 to expand thereby allowing end 57 of lock bolt 45 to retract from the opening 56 provided in hinge pin member 42. From the foregoing it may be seen that upon engagement of lock 58 lock bolt 45 prevents removal of cup 43 from hinge pin member 42 while allowing tailgate 12 to rotate about the axis of hinge pin member 42.

Second Alternative Embodiment

Referring now to FIG. 7, a second alternative embodiment of the locking device 70 of the present invention is shown. As in the preferred embodiment and the first alternative embodiment locking device 70 is located in tailgate 12. The hinge mechanism comprises a cup 65 attached to tailgate 12 and a hinge pin member 66 attached to truck body 11. A lock bolt 62 is located centrally in the locking device 70 with the capability of lateral movement through opening 71 provided in cup 65 of lock bolt end 73 into and from an opening 67 provided in hinge pin member 66. As in the preferred embodiment, a lock bolt support housing 69 is provided allowing lateral movement of lock bolt 62. Spring means (not shown) are provided within lock bolt housing 69 to normally bias lock bolt 62 in the direction of hinge pin member 66. In the present embodiment a solenoid 61 is provided as the power means to move lock bolt 62. Electrical lines 63 and 64 connect solenoid 61 to a power source (not shown) and activating switch (not shown). Upon de-activation of solenoid 61, the spring means (not shown) within lock bolt housing 69 move lock bolt 62 in the direction of hinge pin member 66, thereby causing end 73 of lock bolt 62 to be received in the opening 67 provided in pin member 66. Upon activation of solenoid 61, the solenoid 61 moves lock bolt 62 in the direction opposite hinge pin member 66 causing end 73 of lock bolt 62 to retract from opening 67.

Third Alternative Embodiment

Figure 8:
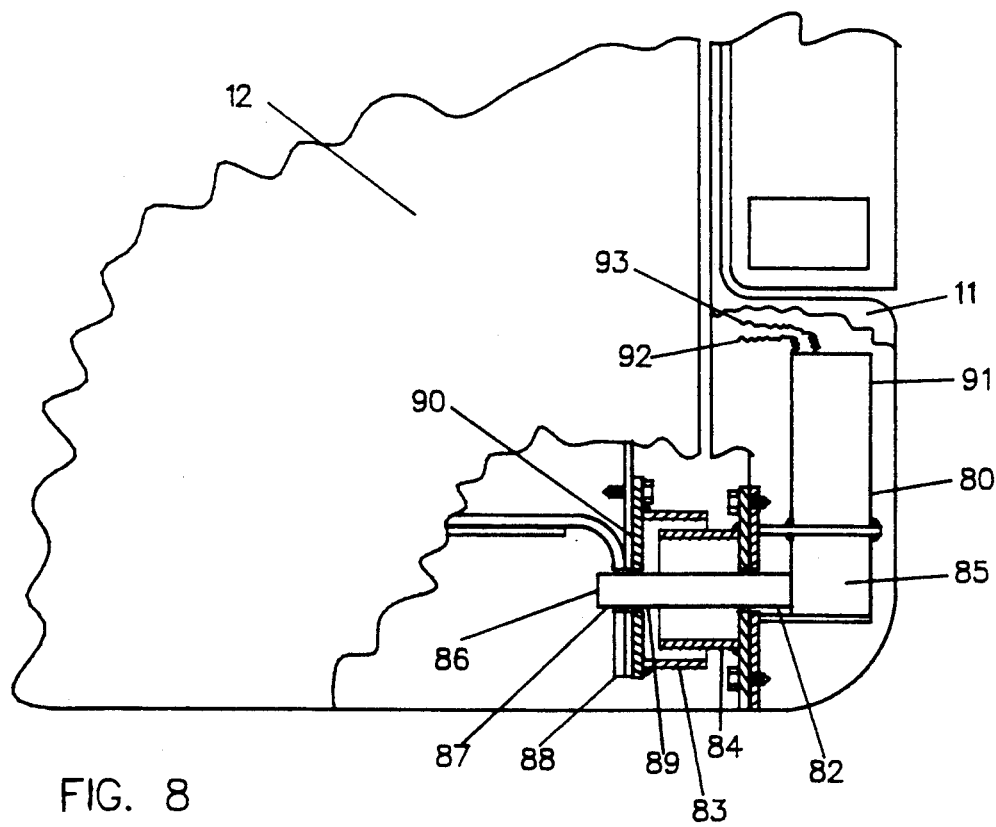
FIG. 8 illustrates a cut-away view of an alternative embodiment comprising a solenoid-activated lock bolt installed in the truck body of a conventional pickup truck tailgate and truck body.

Referring now to FIG. 8, a third alternative embodiment of the locking device of the present invention is shown. A locking device 80 is located in truck body 11. The hinge mechanism comprises a cup 83 attached to tailgate 12 and a hinge pin member 84 attached to truck body 11. A lock bolt 82 is provided in lock bolt housing 85 of locking device 80 with the capability of lateral movement of lock bolt end 86 into and from opening 87 provided in tailgate wall 88 and into and from opening 89 provided in end wall 90 of cup 83. Spring means (not shown) are provided within lock bolt housing 80 to normally bias lock bolt 82 in the direction of end 86 of lock bolt 82 such that end 86 is received within opening 87. In the present embodiment a solenoid 91 is provided in the truck body 11 as the power means to move lock bolt 82. Electrical lines 92 and 93 connect solenoid to a power source (not shown) and activating switch (not shown). Upon de-activation of solenoid 91, spring means (not shown) move lock bolt 82 in the direction of end 86, thereby causing end 86 of bolt 82 to be received in opening 87 through opening 89. Upon activation of solenoid 91, the solenoid 91 moves lock bolt 82 in the direction away from the tailgate 12 thereby removing end 86 from opening 87. From the foregoing it may be seen that upon deactivation of solenoid 91 lock bolt 82 prevents removal of hinge pin member 84 from cup 83 while allowing tailgate 12 to rotate about the axis of hinge pin member 84.

It may be seen from the foregoing that the lock bolt housing, lock bolt and lock may alternatively be provided in the truck body with the lock bolt to be received in the receiver cup located on the tailgate.

Still other embodiments of the present invention may be practiced without departing from the scope hereof.

Although this invention has been described fully with special emphasis upon a preferred embodiment, and alternative embodiments disclosed, it should be understood that within the scope of the appended claims the invention may be practiced otherwise than as specifically described herein.

I claim:

1. In combination with a pickup truck having a truck body and a tailgate mounted on the truck body, such tailgate being attached by a hinge mechanism having an axis, such hinge mechanism comprising a pin member connected to the truck body and a receiving cup connected to the tailgate for removable engagement of the pin member within the receiving cup, such hinge mechanism allowing rotation of the tailgate about the axis of the hinge mechanism, a locking device comprising:

a lock bolt housing connected to the tailgate member;

a lock bolt contained within the lock bolt housing;

said lock bolt being laterally movable with relation to the said tailgate member and lock bolt housing;

said lock bolt housing and lock bolt being so located on the tailgate with relation to the receiving cup and pin member of the hinge mechanism that a central axis of the lock bolt, coincides with a central axis of the receiving cup and a central axis of the pin member;

an opening provided at the central axis of the receiving cup, such opening having a diameter slightly larger than a diameter of the lock bolt;

an opening provided at the central member, such opening having a diameter slightly larger than the diameter of the lock bolt;

means for providing lateral movement of said lock bolt in the direction of the central axis of the lock bolt through the receiving cup opening into the pin member opening;

means for providing lateral movement of said lock bolt in the direction of the central axis of the lock bolt out of the receiving cup opening;

wherein said lock bolt may be moved along its axis in relation to said receiving cup and pin member thereby causing the said lock bolt to be received within the pin member opening and thereby preventing disengagement of the pin member from the receiving cup while the lock bolt is so received.

2. The apparatus according to claim 1 wherein
the said means for providing lateral movement of the lock bolt into the pin member opening includes a cylinder lock and lock plate located at the end of the lock bolt opposite the hinge mechanism wherein rotation of the cylinder lock plate against the lock bolt and in the direction of the hinge mechanism causes the lock bolt to move into the pin member opening.

3. The apparatus according to claim 1 wherein
the said means for providing movement of the lock bolt out of the pin member opening comprises spring means compressably biased between the end of the lock bolt housing adjacent the receiving cup and a protruding member provided on the lock bolt wherein the spring means causes the lock bolt to move out of the pin member opening upon rotation of a cylinder lock cam in the direction opposite the hinge mechanism.

4. The apparatus according to claim 1 wherein
the said means for providing lateral movement of the lock bolt comprises an electrically-powered solenoid.

5. In combination with a pickup truck having a truck body and a tailgate mounted on the truck body, such tailgate being attached by a hinge mechanism having an axis, such hinge mechanism comprising a pin member connected to the truck body and a receiving cup connected to the tailgate for removable engagement of the pin member within the receiving cup, such hinge mechanism allowing rotation of the tailgate about the axis of the hinge mechanism, a locking device comprising:
  a lock bolt housing connected to the truck body;
  a lock bolt contained within the lock bolt housing;
  said lock bolt being laterally movable with relation to the said truck body and lock bolt housing;
  said lock bolt housing and lock bolt being so located on the truck body with relation to the receiving cup and pin member of the hinge mechanism that a central axis of the lock bolt coincides with a central axis of the receiving cup and a central axis of the pin member;
  an opening provided at the central axis of the receiving cup, such opening having a diameter slightly larger than a diameter of the lock bolt;
  an opening provided at the central axis of the pin member, such opening having a diameter slightly larger than the diameter of the lock bolt;
  means for providing lateral movement of said lock bolt in the direction of the central axis of the lock bolt through the pin member opening into the receiving cup opening;
  means for providing lateral movement of said lock bolt in the direction of the central axis of the lock bolt out of the receiving cup opening;
  wherein said lock bolt may be moved in the direction of the lock bolt axis in relation to said receiving cup and pin member thereby causing the said lock bolt to be received within the receiving cup opening and thereby preventing disengagement of the pin member from the receiving cup while the lock bolt is so received.

6. The apparatus according to claim 5 wherein
the said means for providing lateral movement of the lock bolt comprises an electrically-powered solenoid.

* * * * *